(12) United States Patent
Nuzzi et al.

(10) Patent No.: US 8,762,224 B2
(45) Date of Patent: Jun. 24, 2014

(54) PAYER DEVICE THAT CHANGES PHYSICAL STATE BASED ON PAYER INFORMATION

(75) Inventors: Frank Anthony Nuzzi, Pflugerville, TX (US); James Brett Sowder, Austin, TX (US)

(73) Assignee: eBay Inc., San Jose, CA (US)

( * ) Notice: Subject to any disclaimer, the term of this patent is extended or adjusted under 35 U.S.C. 154(b) by 440 days.

(21) Appl. No.: 13/152,641

(22) Filed: Jun. 3, 2011

(65) Prior Publication Data

US 2012/0310777 A1 Dec. 6, 2012

(51) Int. Cl.
*G06Q 30/00* (2012.01)

(52) U.S. Cl.
USPC ............ 705/26.41; 705/701; 705/39; 705/44; 715/702; 715/864; 715/700; 345/156; 348/207.2

(58) Field of Classification Search
USPC .............. 705/26.41, 701; 715/702, 701, 864; 715/700; 345/156
See application file for complete search history.

(56) References Cited

U.S. PATENT DOCUMENTS

| | | | |
|---|---|---|---|
| 2002/0177471 A1* | 11/2002 | Kaaresoja et al. | 455/567 |
| 2003/0122779 A1* | 7/2003 | Martin et al. | 345/156 |
| 2006/0252530 A1* | 11/2006 | Oberberger et al. | 463/29 |
| 2008/0162347 A1* | 7/2008 | Wagner | 705/44 |
| 2009/0284482 A1* | 11/2009 | Chin | 345/173 |

* cited by examiner

*Primary Examiner* — Vanel Frenel
(74) *Attorney, Agent, or Firm* — Haynes and Boone, LLP

(57) ABSTRACT

A method for providing payer information on a payer device includes providing a payer device that includes at least one physical state change component moveably coupled to the payer device. Payer information is received over a network. The payer information is then determined to be associated with a physical state change instruction in a non-transitory, machine-readable medium of the payer device. The at least one physical state change component is then actuated according to the physical state change instruction to provide the payer information to a payer by changing the physical state of the payer device.

20 Claims, 18 Drawing Sheets

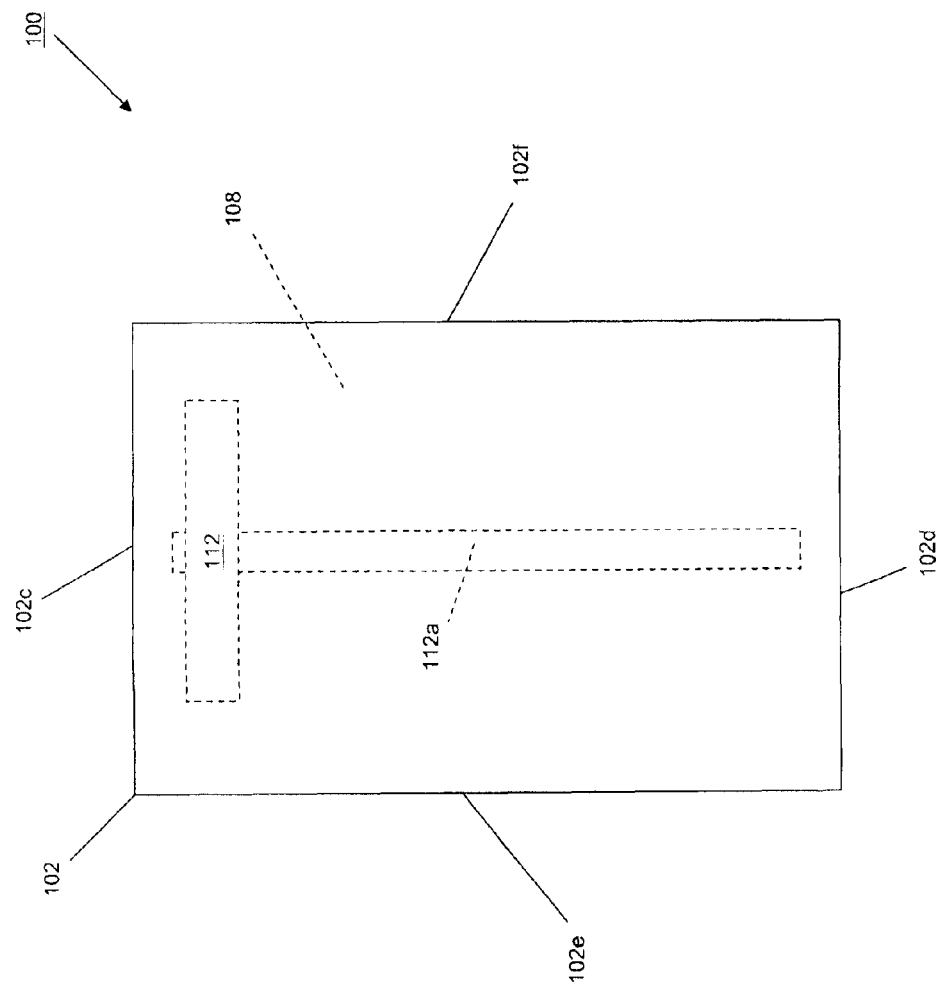

PAYER DEVICE THAT CHANGES PHYSICAL STATE BASED ON PAYER INFORMATION

BACKGROUND

1. Field of the Invention

The present invention generally relates to online and/or mobile payments and more particularly to a payer device that changes its physical state based on payer information retrieved from a payer account.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

In order to make online and/or mobile payments, payers typically use a payer account provided by a payment service provider, an account provider, and/or a variety of other entities known in the art, and the payer account typically includes funds that allow the payer to make payments. However, conventional access to the payer account requires that a payer key-in a username and password on a payer device, and retrieval of payer information from the payer account (e.g., available funds, payment status, etc.) requires that the payer navigate through and/or view a plurality of web pages or application screens in order to find that payer information. The need to key in access credentials and/or navigate to a payer account using the payer device is time consuming for a payer.

Thus, there is a need for an improved system to access payer information using a payer device.

SUMMARY

According to one embodiment, a method for providing payer information on a payer device is performed on a payer device including at least one physical state change component moveably coupled to the payer device. Payer information is received over a network and determined to be associated with a physical state change instruction, and the at least one physical state change component is then actuated according to the physical state change instruction to change the physical state of the payer device.

In an embodiment, the physical state change of the payer device may include an increase in a perimeter surface of the payer device and/or the movement of a weight housed in the payer device in response to the payer information indicating that a funding amount of a payer account has changed. In another embodiment, the physical state change of the payer device may include a repeated pulse vibration that changes frequency in response to the payer information indicating that the status of a payment being made from a payer account is changing.

As a result, a payer may be provided payer information by the changing physical state of the payer device, which frees the payer from needing to look at the payer device to receive the payer information.

These and other features and advantages of the present disclosure will be more readily apparent from the detailed description of the embodiments set forth below taken in conjunction with the accompanying figures.

BRIEF DESCRIPTION OF THE FIGURES

FIG. 1b is a schematic front view illustrating an embodiment of the payer device of FIG. 1a;

FIG. 1d is a schematic front view illustrating an embodiment of the payer device of FIG. 1a;

FIG. 2f is a schematic front view illustrating an embodiment of the payer device of FIGS. 1a, 1d and 1e after a physical state change.

Figure 1A:
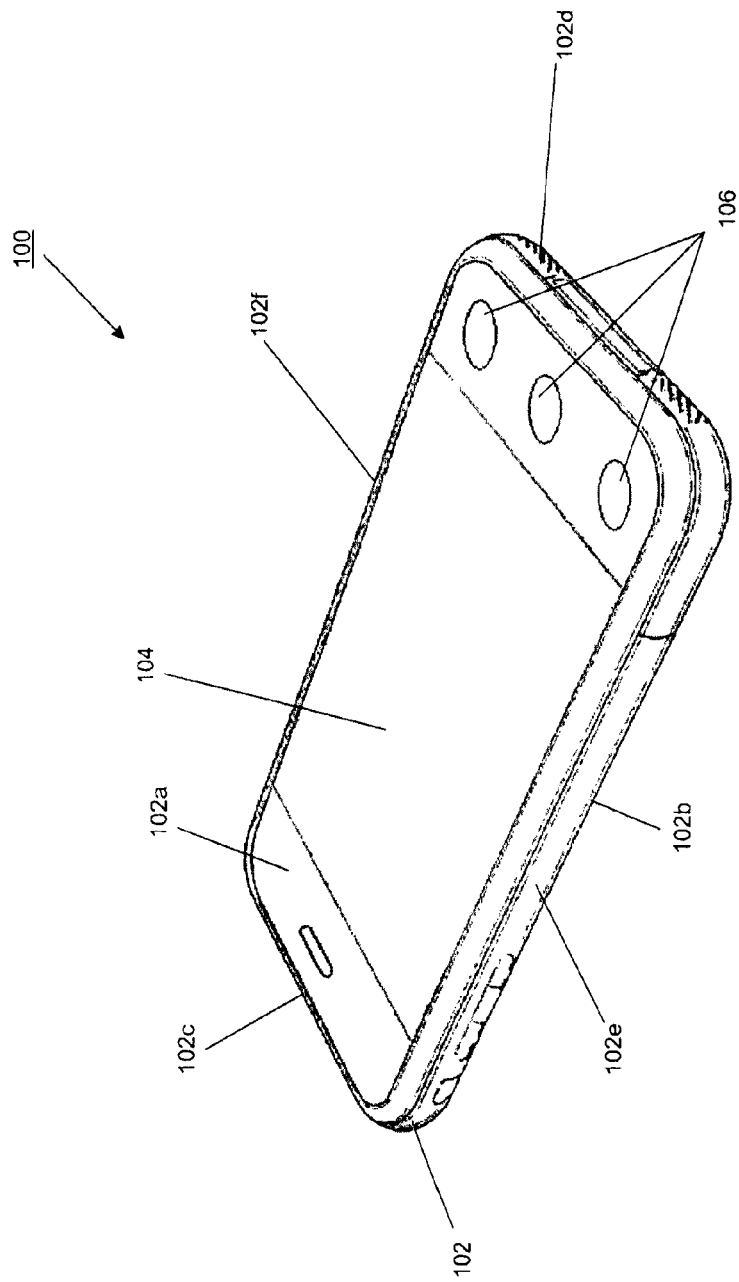
FIG. 1a is a perspective view illustrating an embodiment of a payer device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a payer device and method of using the payer device to provide payer information from a payer account to a payer. The payer device includes at least one physical state change component moveably coupled to the payer device. Payer information from the payer account is retrieved over a network and determined to be associated with a physical state change instruction that is stored in the payer device, and the at least one physical state change component is then actuated according to the physical state change instruction to change the physical state of the payer device such that the payer information is provided to the payer.

In an embodiment, as discussed in further detail below, in response to a change of a funding amount of the payer account, the perimeter surface of the payer device may be changed. For example, an increase in the funding amount of the payer account may result in an increase in the perimeter surface of the payer device which results in the feeling of a relatively larger volume payer device to the payer that indicates a relatively higher funding amount in the payer account. In another example, a decrease in the funding amount of the payer account may result in an decrease in the perimeter surface of the payer device which results in the feeling of a relatively smaller volume payer device to the payer that indicates a relatively lower funding amount in the payer account.

In an embodiment, as discussed in further detail below, in response to a change of a funding amount of the payer account, the position of a weight in the payer device may be changed. For example, an increase in the funding amount of the payer account may result in the movement of the weight from a bottom of the payer device to a top of the payer device, which results in the feeling of a "full" payer device to the payer that indicates a relatively higher funding amount in the payer account. In another example, a decrease in the funding amount of the payer account may result in the movement of the weight from the top of the payer device to the bottom of the payer device which results in the feeling of an "empty" payer device to the payer that indicates a relatively lower funding amount in the payer account.

In an embodiment, as discussed in further detail below, in response to a change in status of a payment being made using the payer account, the frequency of a repeated pulse vibration in the payer device may be changed. For example, as a payment being made using the payer account is initiated, the frequency of the repeated pulse vibration in the payer device may be relatively slow. As the payment being made using the payer account moves closer to completion, the frequency of the repeated pulse vibration in the payer device may be increased until the payment is completed, which provides a "heartbeat" that is felt by payer and indicates the status of the payment being made from the payer account.

Physical state changes of the payer device may also be used to provide information to the payer device, as discussed in further detail below. For example, the payer may manipulate the at least one physical state change component on the payer device into a predetermined configuration or sequence of configurations to provide a "passcode" to access the payer account.

Referring now to FIGS. 1a, 1b, 1c, 1d, and 1e, an embodiment of a payer device 100 is illustrated. The payer device 100 includes a payer device chassis 102 including a front surface 102a, a rear surface 102b located opposite the payer device chassis 102 from the front surface 102a, a top surface 102c extending between the front surface 102a and the rear surface 102b, a bottom surface 102d located opposite the payer device chassis 102 from the top surface 102c, and a pair of opposing side surfaces 102e and 102f extending between the front surface 102a, the rear surface 102b, the top surface 102c, and the bottom surface 102d. A display 104 is included on the payer device chassis 102 and extends between the side surfaces 102e and 102f immediately adjacent the front surface 102a. An input device of the payer device 100 includes the display 104 and a plurality of input buttons 106 that are located on the front surface 106a adjacent the bottom surface 102d. One of skill in the art will recognize that the payer device 100 is a portable or mobile phone including a touch screen input device and a plurality of input buttons that allow the functionality discussed below with reference to the method 200. However, a variety of other portable/mobile user devices and/or desktop user devices may be used in the method 200 without departing from the scope of the present disclosure.

The payer device chassis 102 defines a payer device housing 108 between the front surface 102a, the rear surface 102b, the top surface 102c, the bottom surface 102d and the side surfaces 102e and 102f. A plurality of computing and/or other components may be housed in the payer device housing 108, discussed in further detail below. A plurality of physical state change components are also coupled to the payer device chassis 102 and at least partially housed in the payer device housing 108.

Figure 1B:
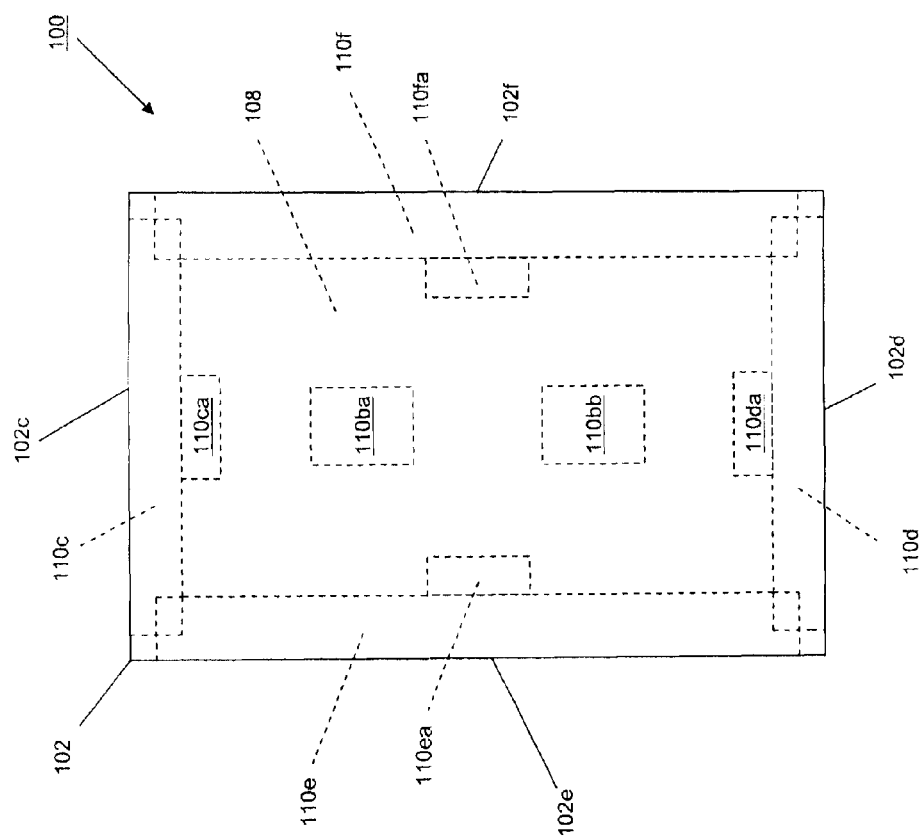
Figure 1C:
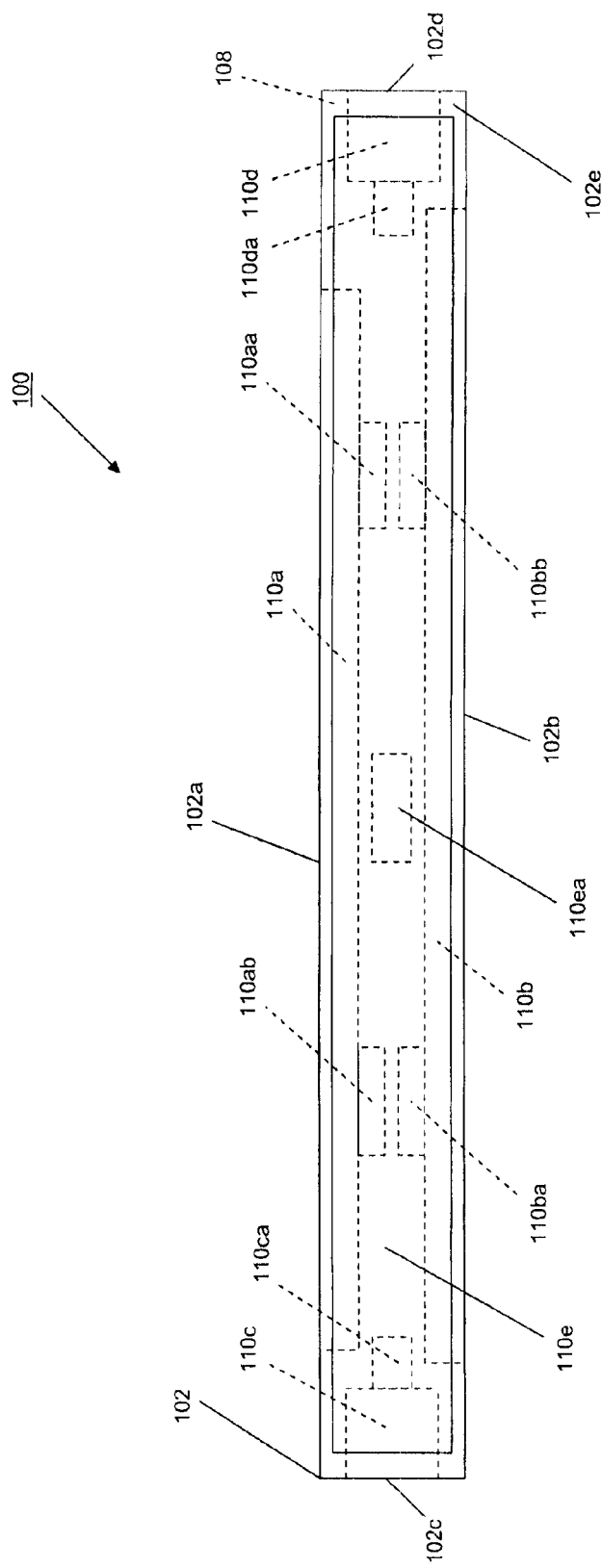
FIG. 1c is a schematic side view illustrating an embodiment of the payer device of FIGS. 1a and 1b.

In the embodiment illustrated in FIGS. 1b and 1c, the payer device 100 includes a front physical state change component 110a housed in the payer device housing 108 and located adjacent the front surface 102a of the payer device chassis 102. In an embodiment, the front physical state change component 110a may include at least a portion of the display 104. The front physical state change component 110a is moveably coupled to a plurality of actuators 110aa and 110ab that are housed in the payer device housing 108. The payer device 100 also includes a rear physical state change component 110b housed in the payer device housing 108 and located adjacent the rear surface 102b of the payer device chassis 102. The rear physical state change component 110b is moveably coupled to a plurality of actuators 110ba and 110bb that are housed in the payer device housing 108.

The payer device 100 also includes a top physical state change component 110c housed in the payer device housing 108 and located adjacent the top surface 102c of the payer device chassis 102. The top physical state change component 110c is moveably coupled to an actuator 110ca that is housed in the payer device housing 108. The payer device 100 also includes a bottom physical state change component 110d housed in the payer device housing 108 and located adjacent the bottom surface 102d of the payer device chassis 102. The bottom physical state change component 110d is moveably coupled to an actuator 110da that is housed in the payer device housing 108. The payer device 100 also includes a first side physical state change component 110e housed in the payer device housing 108 and located adjacent the side surface 102e of the payer device chassis 102. The first side physical state change component 110e is moveably coupled to an actuator 110ea that is housed in the payer device housing 108. The payer device 100 also includes a second side physical state change component 110f housed in the payer device housing 108 and located adjacent the side surface 102f of the payer device chassis 102. The second side physical state change component 110f is moveably coupled to an actuator 110fa that is housed in the payer device housing 108. While a plurality of physical state change components and actuators have been illustrated and described, one of skill in the art will recognize that physical state change components may be added or removed from the payer device 100 and actuators may be added or removed from the physical state change components while remaining within the scope of the present disclosure.

Figure 1D:
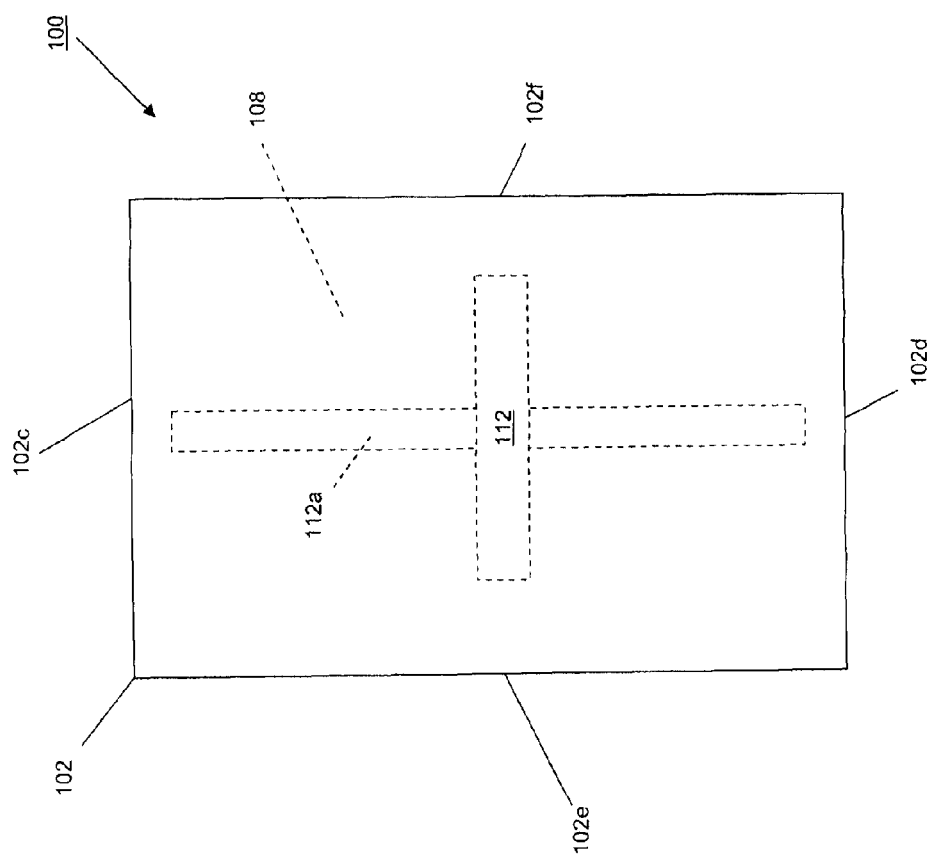
Figure 1E:
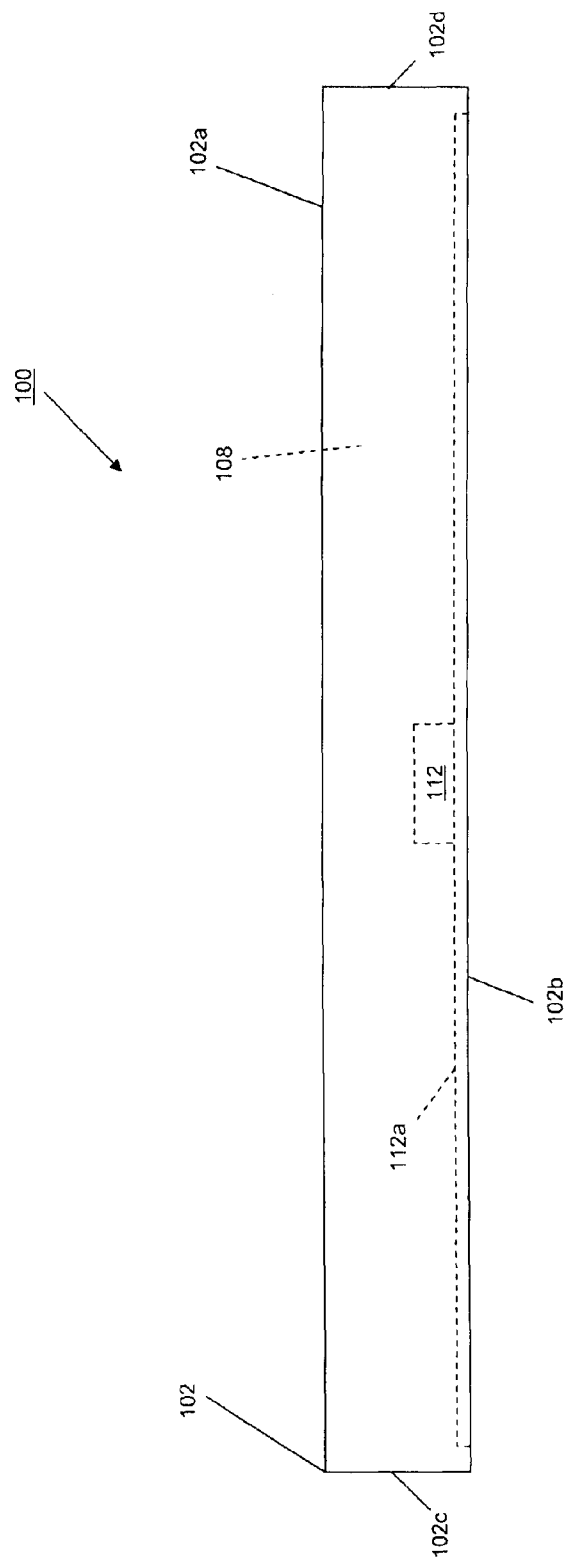
FIG. 1e is a schematic side view illustrating an embodiment of the payer device of FIGS. 1a and 1d.

In the embodiment illustrated in FIGS. 1*d* and 1*e*, the payer device 100 includes a weight physical state change component 112 housed in the payer device housing 108 and located adjacent the rear surface 102*b* of the payer device chassis 102. The weight physical state change component 112 is moveably coupled to an actuator track 112*a* that is housed in the payer device housing 108 and is positioned along the length of the payer device chassis 102.

While a plurality of physical state change components have been illustrated, they are meant to be merely exemplary and one of skill in the art will recognize that a variety of other physical state change components and component configurations may be included in the payer device 100 without departing from the scope of the present disclosure. Furthermore, the physical state change components of FIGS. 1*b* and 1*c* have been illustrated separately from the physical state change components of FIGS. 1*d* and 1*e* for clarity of discussion, and those and other physical state change components may be combined into a single payer device 100 while remaining within the scope of the present disclosure.

Figure 2A:
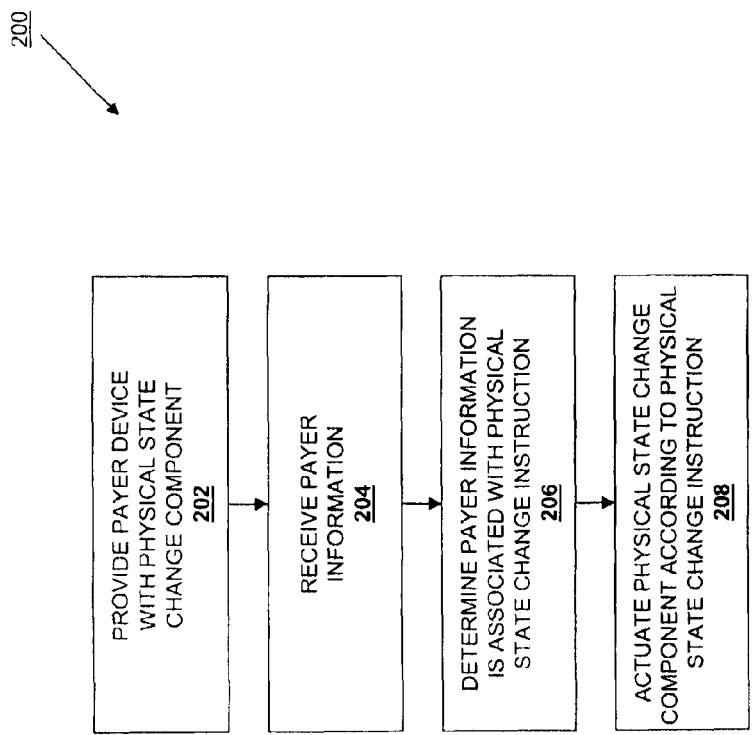
FIG. 2a is a flow chart illustrating an embodiment of a method for providing payer information on a payer device.

Referring now to FIG. 2*a*, a method 200 for providing payer information on a payer device is illustrated. The method 200 begins at block 202 where a payer device is provided that includes at least one physical state change component moveably coupled to a payer device. In an embodiment, the payer device 100, discussed above with reference to FIGS. 1*a*, 1*b*, 1*c*, 1*d*, and 1*e*, is provided that includes the physical state change components 110*a*, 110*b*, 110*c*, 110*d*, 110*e*, 110*f*, and/or 112. The payer device 100 may also include a processor, a non-transitory machine-readable medium, a network interface, and/or a variety of other components known in the art and discussed in further detail below. In an embodiment, the payer device 100 is associated with a payer account that may be provided by a payment service provider, a payee, an account provider, and/or a variety of other entities known in the art. The payer account may be funded by one or more funding sources such that a funding amount is associated with the payer account, and a payer may use the payer device 100 to may payments to payees with funds included in the payer account.

The method 200 then proceeds to block 204 where the payer device receives payer information. The payer device 100 is operable, e.g., using the processor and the network interface, to receive payer information over a network (e.g., the Internet.) In an embodiment, the payer device 100 may receive payer information associated with the payer account over the network from a payment service provider device, a payee device, an account provider device, and/or from a variety of other devices known in the art. The payer device 100 may receive the payer information in response to an action detected from the payer device 100, the payment service provider device, the payee device, the account provider device, and/or from a variety of other devices known in the art. For example, the payer information may include a change in the funding amount (an addition of funds, a subtraction of funds, etc.) associated with the payer account. The payer information may be sent by the payment service provider device, payee device, and/or account provider device and received by the payer device 100 in response to detecting the change in the funding amount associated with the payer account by the payment service provider device, payee device, and/or account provider device. In another example, the payer information may be retrieved by the payer device from the payment service provider device, payee device, and/or account provider device in response to detecting an action on the payer device 100 (e.g., an instruction to periodically check the funding amount of the payer account, an action that may change in the funding amount associated with the payer account, etc.)

In another embodiment, the payer device 100 may receive payer information associated with a payment being made over the network from a payment service provider device, an account provider device, a payee device, combinations thereof, and/or a variety of other device known in the art. The payer device may receive the payer information in response to an action detected from the payer device, the payment service provider device, the payee device, the account provider device, and/or from a variety of other devices known in the art. For example, the payer information may include a status of a payment being made using the payer account. The payer information may be sent by the payment service provider device, payee device, and/or account provider device and received by the payer device 100 in response to detecting a change in the status of the payment being made using the payer account by the payment service provider device, payee device, and/or account provider device. In another example, the payer information may be retrieved by the payer device 100 from the payment service provider device, payee device, and/or account provider device in response to detecting an action on the payer device (e.g., an instruction to make a payment.)

The method 200 then proceeds to block 206 where the payer device determines that the payer information is associated with a physical state change instruction. As discussed above, the payer device 100 includes a machine-readable medium. In an embodiment, the machine-readable medium (e.g., a database in a memory or other information storage device) includes one or more physical state change instructions that are associated with payer information, and the payer device 100 (e.g., using the processor) may determine that the payer information received in block 204 of the method 200 is associated with physical state change instructions in the machine-readable medium. In an embodiment, one or more physical state change instructions may be specified by the payer to produce desired and/or predetermined physical state changes of the payer device 100 in response to particular payment information, and those physical state change instructions may be stored in the machine-readable medium of the payer device 100.

The method 200 then proceeds to block 208 where at least one physical state change component in the payer device 200 is actuated according to the physical state change instruction. While a variety of examples of physical state changes of the payer device 200 are described below, they are meant to be exemplary, and one of skill in the art will appreciate that a variety of different physical state change components may be utilized to provide a variety of different physical state changes of the payer device that convey payer information to a payer without departing from the scope of the present disclosure.

Figure 2B:
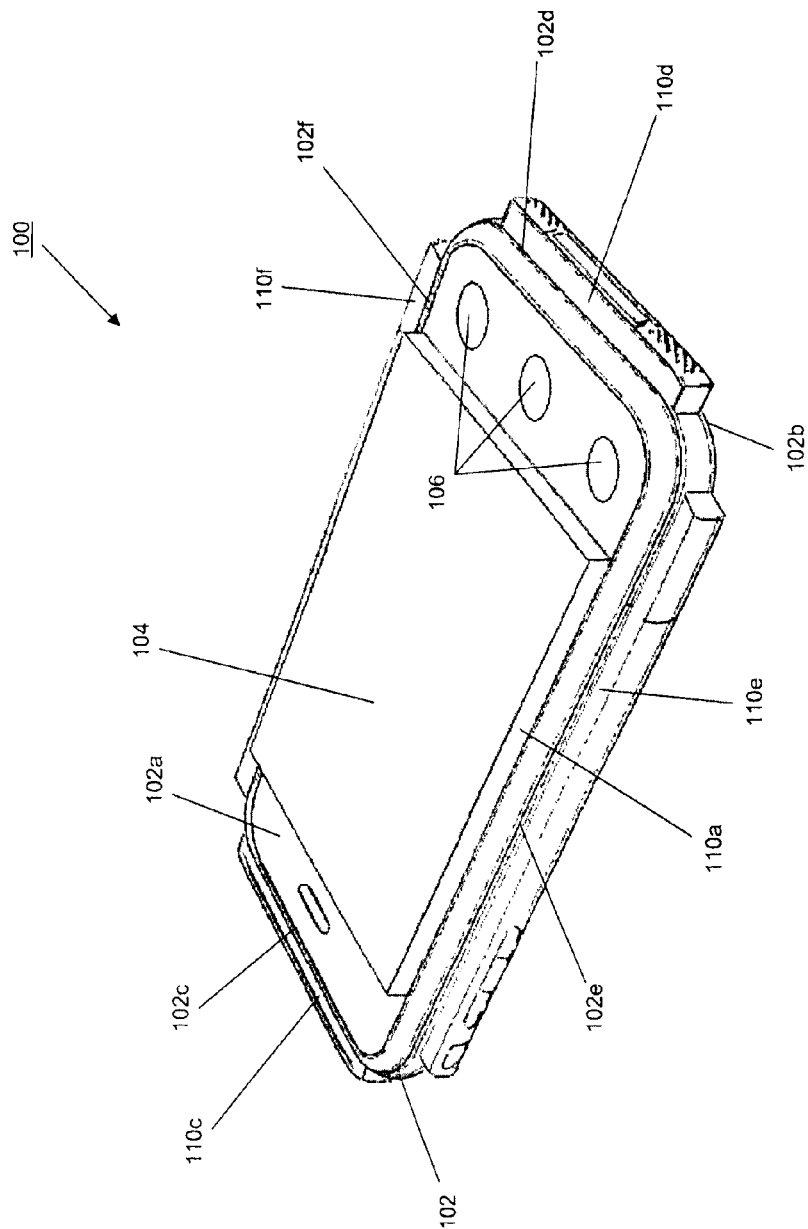
FIG. 2b is a perspective view illustrating an embodiment of the payer device of FIGS. 1a, 1b, and 1c after a physical state change.
Figure 2C:
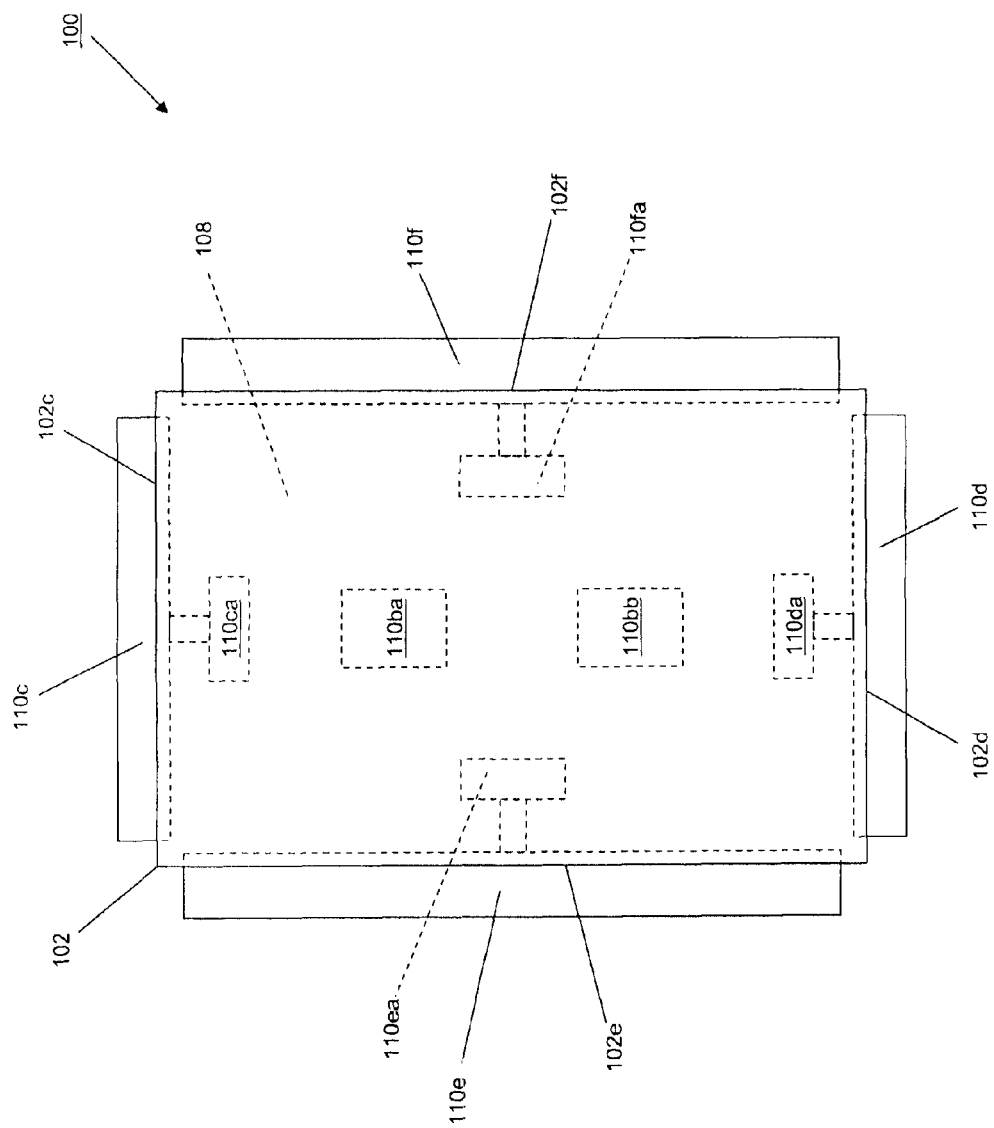
FIG. 2c is a schematic front view illustrating an embodiment of the payer device of FIGS. 1a, 1b, and 1c after a physical state change.
Figure 2D:
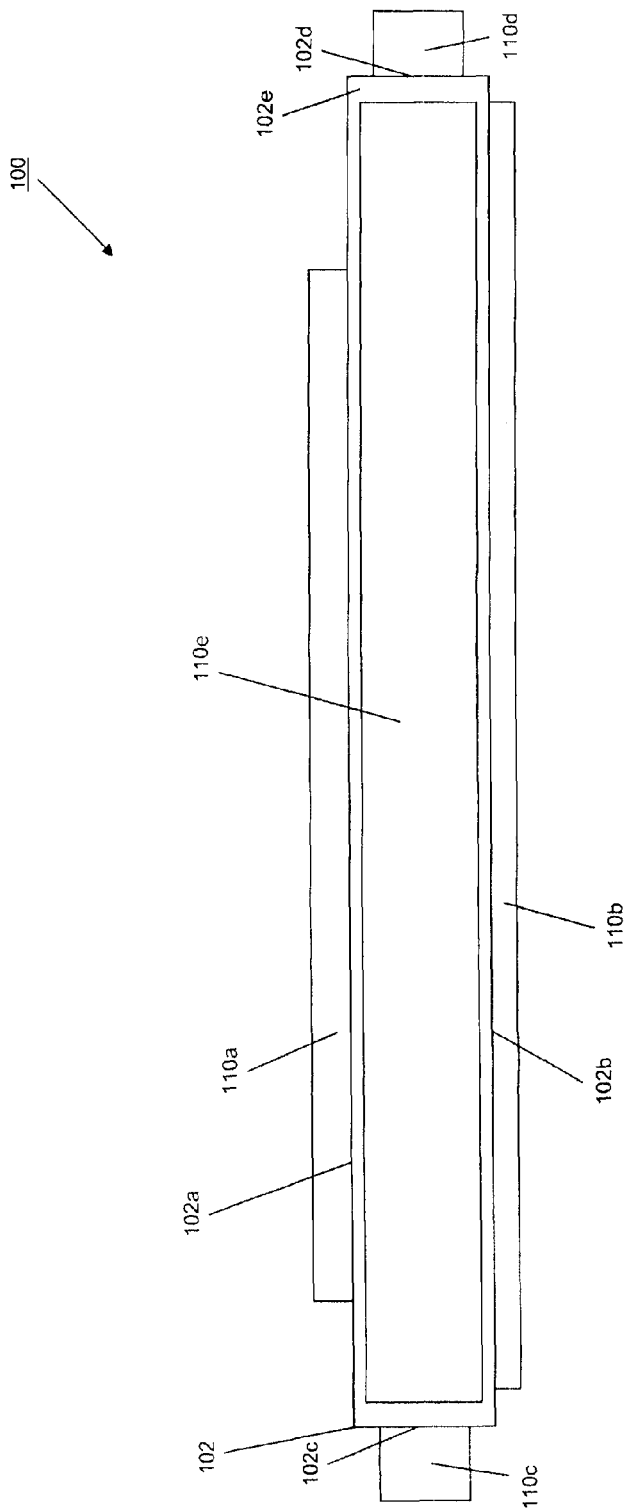
FIG. 2d is a schematic side view illustrating an embodiment of the payer device of FIGS. 1a, 1b and 1c after a physical state change.

Referring now to FIGS. 2*a*, 2*b*, 2*c*, 2*d*, and 2*e*, an embodiment of a physical state change of the payer device 100 at block 208 of the method 200 is described and illustrated. In this embodiment, the payer information received by the payer device 100 at block 204 of the method 200 may have included an increase in the funding amount associated with the payer account, and the physical state change instruction determined to be associated with that payer information may have included an instruction to increase the perimeter surface of the payer device 100. At block 208 of the method 200, in response to the physical state change instruction, the payer device 100 (e.g., using the processor) actuates: the actuators 110*aa* and 110*ab* to move the front physical state change component 110*a* relative to the payer device chassis 102*a* and out of the payer device housing 108, the actuators 110*ba* and 110*bb* to move the rear physical state change component 110*b* relative to the payer device chassis 102*a* and out of the payer device housing 108, the actuator 110*c* to move the top physical state change component 110*c* relative to the payer device chassis 102*a* and out of the payer device housing 108, the actuator 110*da* to move the bottom physical state change component 110*d* relative to the payer device chassis 102*a* and out of the payer device housing 108, the actuator 110*ea* to move the first side physical state change component 110*e* relative to the payer device chassis 102*a* and out of the payer device housing 108, and the actuator 110*fa* to move the second side physical state change component 110*f* relative to the payer device chassis 102*a* and out of the payer device housing 108, as illustrated in FIGS. 2*b*, 2*c*, and 2*d*.

As can been seen in FIGS. 1*a*, 2*b*, 2*c*, and 2*d*, in response to the increase in the funding amount associated with the payer account, the perimeter surface (i.e., the outer surface) of the payer device 100 has been increased. In an embodiment, as the funding amount in the payer account decreases, a payment instruction may include decreasing the perimeter surface of the payer device 100 by actuating the actuators to move the physical state change components at least partially back into the payer device housing 108. Thus, a payer may be provided payer information (e.g., a changing funding amount associated with a payer account) by changing the payers perceived volume of the payer device 100 (i.e., the 'thicker' the payer device 100, the higher the funding amount associated with the payer account). In an embodiment, the payer device 100 may include a preset or default perimeter surface area. Furthermore, the physical state change instructions may include instructions to proportionally adjust the perimeter surface of the payer device 100 with respect the funding amount associated with the payer account (e.g., the 'thickness' of the phone would range from the 'thickest' at the maximum funding amount to the 'thinnest' when the account is no longer funded.)

In an embodiment, physical state change components may be added to the embodiment illustrated in FIGS. 2*b* and 2*c* to result in a continuous perimeter surface of the payer device 100 after the physical state change has been performed. Furthermore, alternative physical state change components may be used to change the perimeter surface of the payer device 100 such as, for example, physical state change components that expand due to the introduction of fluid, in response to an electrical current, etc.

Figure 2E:
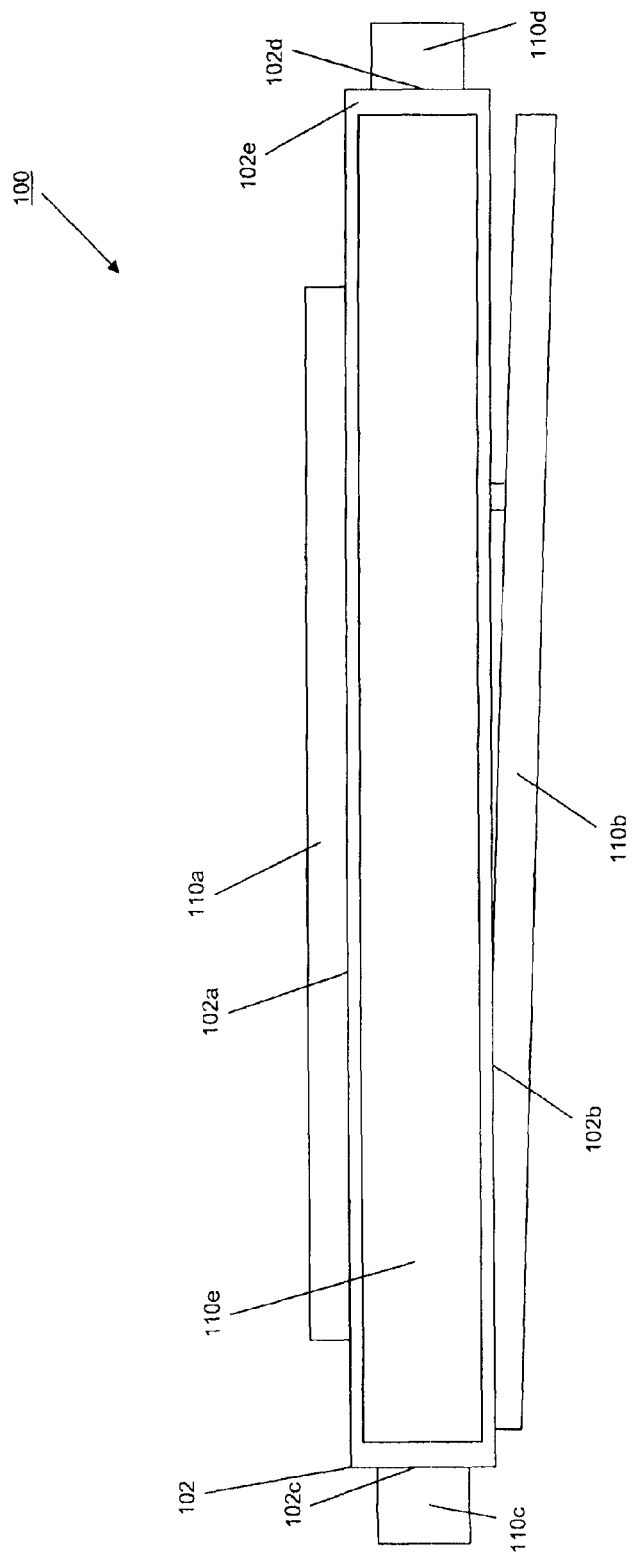
FIG. 2e is a schematic side view illustrating an embodiment of the payer device of FIGS. 1a, 1b, and 1c after a physical state change.

One of skill in the art will recognize that the actuators may be actuated separately or in different combinations to change the physical state of the payer device 100 differently than is illustrated in FIGS. 2*b*, 2*c*, and 2*d*. For example, as illustrated in FIG. 2*e*, the actuator 110*bb* may be actuated to move a portion of the rear physical state change component 110*b* (e.g., the portion adjacent the bottom surface 102*d* of the payee device 100) further relative to the payee device chassis 102 than the actuator 110*ba* is actuated to move another portion of the rear physical state change component 110*b* (e.g., the portion adjacent the top surface 102*c* of the payee device 100.) While examples have been provided, a wide variety of physical state changes of the payer device 100 that provide a variety of physical shapes, volumes, etc. of the payer device 100 are envisioned as falling within the scope of the present disclosure.

Figure 2G:
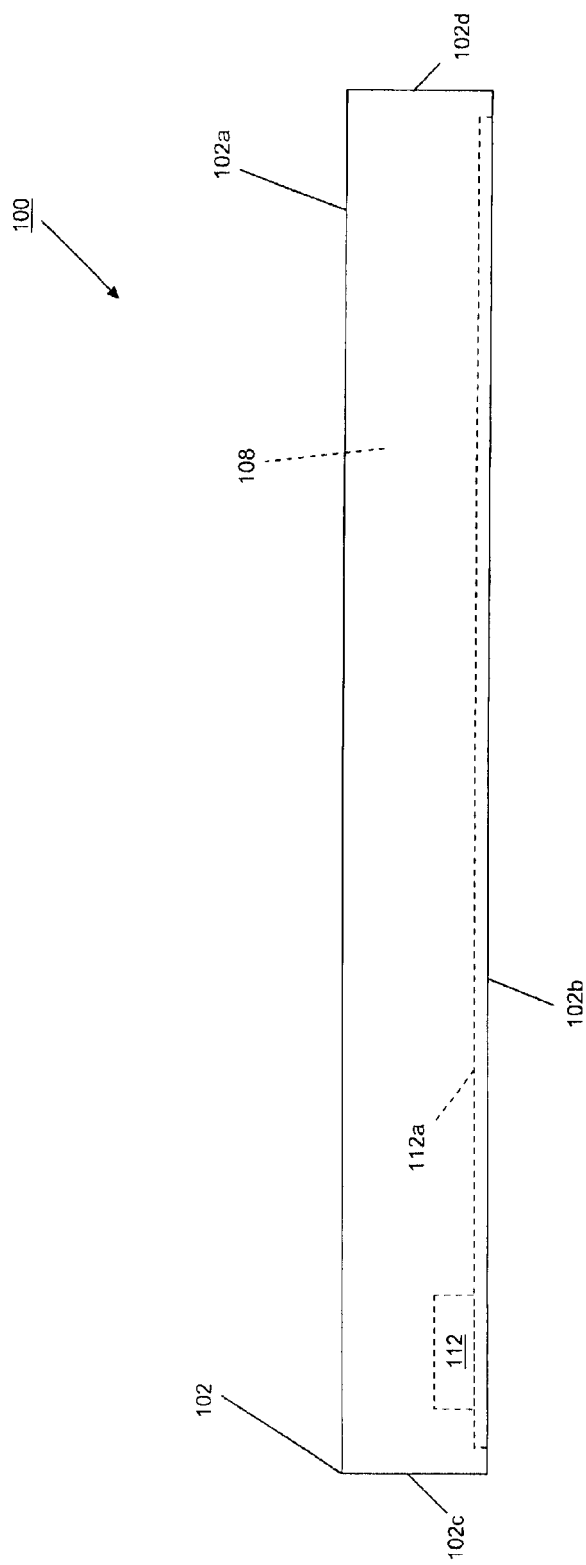
FIG. 2g is a schematic side view illustrating an embodiment of the payer device of FIGS. 1a, 1d and 1e after a physical state change.

Referring now to FIGS. 2*f* and 2*g*, another embodiment of a physical state change of the payer device 100 at block 208 of the method 200 is described and illustrated. In this embodiment, the payer information received by the payer device 100 at block 204 of the method 200 may have included an increase in the funding amount associated with the payer account, and the physical state change instruction determined to be associated with that payer information may have included an instruction to shift the weight of the payer device 100 (e.g., to shift a center of gravity of the payer device 100.) At block 208 of the method 200, in response to the physical state change instruction, the payer device 100 (e.g., using the processor) actuates the actuator track 112*a* to move the weight physical state change component 112 relative to the payer device 100 from the position illustrated in FIG. 1*d* to the position illustrated in FIGS. 2*f* and 2*g*, adjacent the top surface 102*c* of the payee device 100.

Figure 2H:
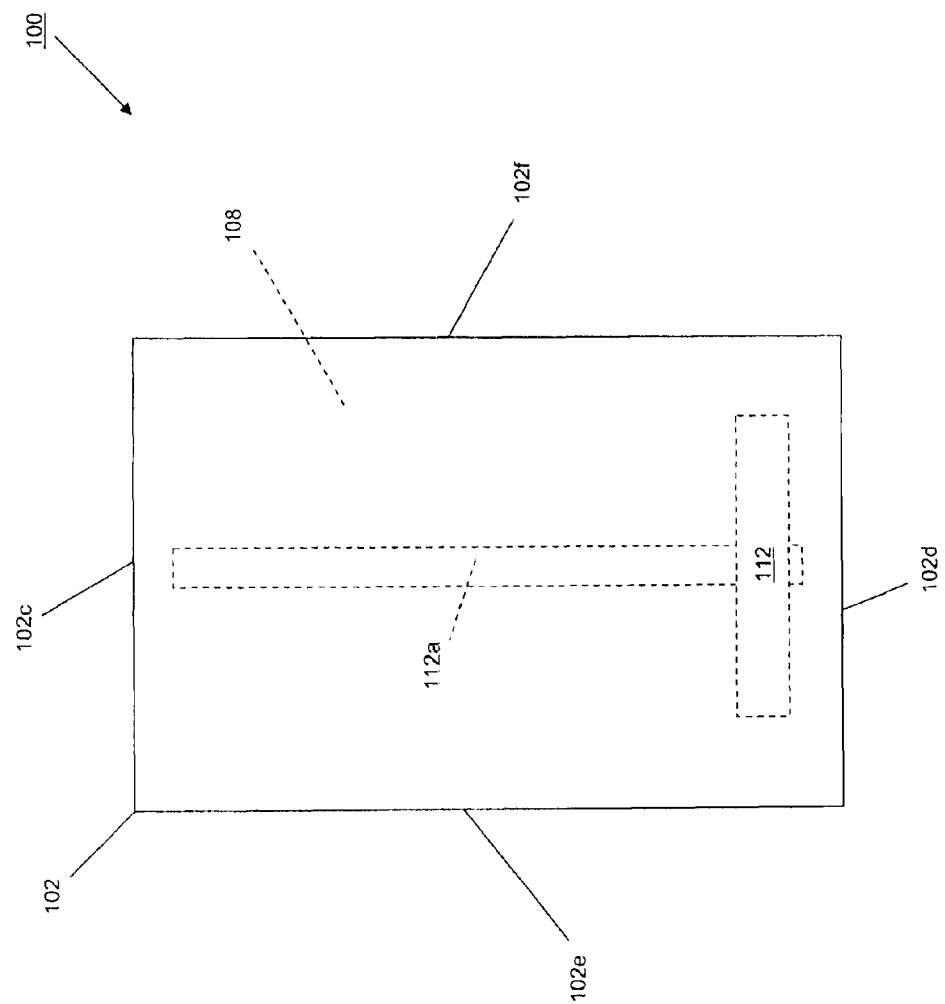
FIG. 2h is a schematic front view illustrating an embodiment of the payer device of FIGS. 1a, 1d, and 1e after a physical state change.
Figure 2I:
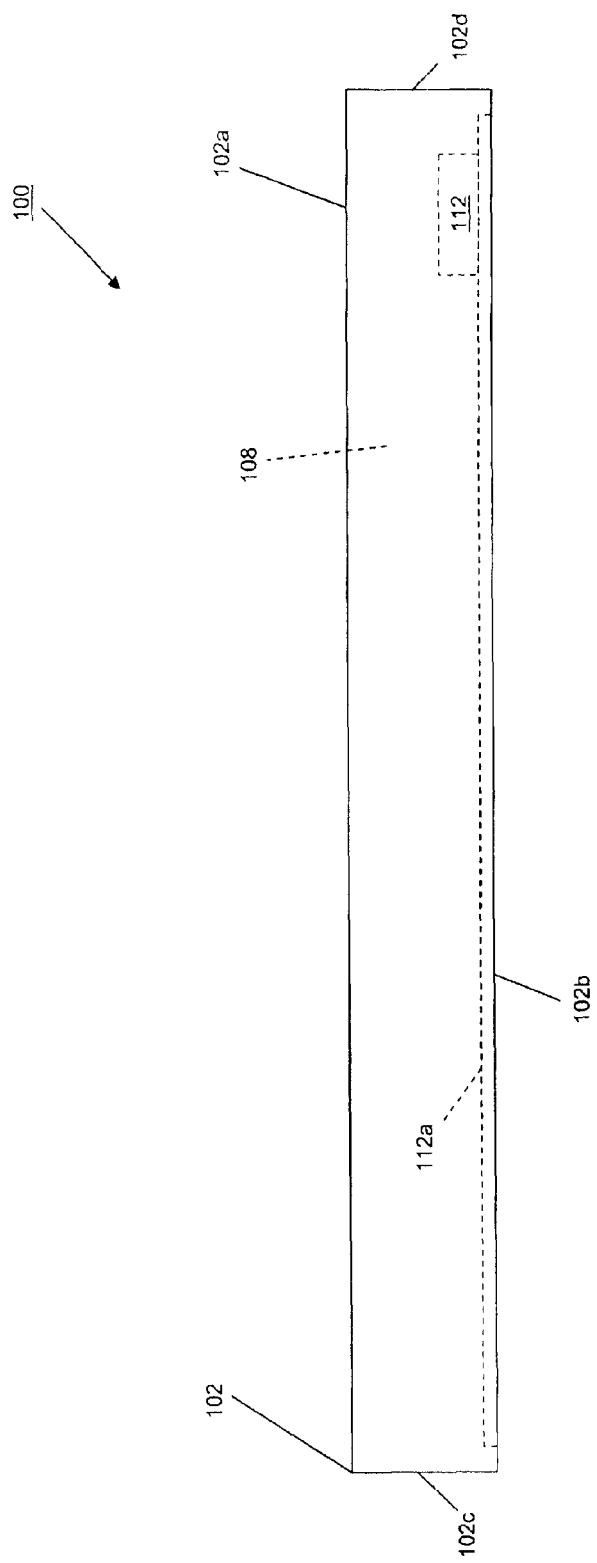
FIG. 2i is a schematic side view illustrating an embodiment of the payer device of FIGS. 1a, 1d, and 1e after a physical state change.

As can been seen in FIGS. 2*f* and 2*g*, in response to the increase in the funding amount associated with the payer account, the weight of the payer device 100 has been shifted. In an embodiment, as the funding amount in the payer account decreases, a payment instruction may include shifting the weight of the payer device 100 by actuating the actuator track 112*a* to move the weight physical state change component 112 to the position illustrated in FIGS. 2*h* and 2*i*, adjacent the bottom surface 102*d* of the payer device 100. Thus, a payer may be provided payer information (e.g., a changing funding amount associated with a payer account, a number of transactions being processed through the payer account, etc.) by shifting the weight of the payer device 100 (i.e., a 'top heavy' or 'full feeling' payer device 100 may indicate a higher funding amount associated with the payer account, while a 'bottom heavy' or 'empty feeling' payer device 100 may indicate a lower funding amount associated with the payer account.) Furthermore, the physical state change instructions may include instructions to proportionally shift the weight of the payer device 100 with respect the funding amount associated with the payer account. In another embodiment, a payer instruction may include instructions to shift of the weight of the payer device 100 in response to a proposed purchase. For example, a payer may be browsing for items on the payer device 100, and in response to proposing a purchase on the payer device 100 (e.g., by adding an item to an electronic shopping cart before confirming payment) the weight of the payer device 100 may be shifted to make the payer device 100 'bottom heavy' to indicate that the payer account has low or insufficient funds to cover the proposed payment.

In an embodiment, different or additional weight physical state change components and actuator trackers may be added to the payer device 100 that allow the weight of the payer device 100 to be shifted differently than described above (e.g., between the side surfaces 102*e* and 102*f*, between corners of the payer device 100, etc.)

In another embodiment, the payer information received by the payer device 100 at block 204 of the method 200 may include a status of a payment made using the payer account, and the physical state change instruction determined to be associated with that payer information may have included an instruction to provide a repeated pulse vibration of the payer device 100 that changes in response to the changing status of the payment. At block 208 of the method 200, in response to the physical state change instruction, the payer device 100 (e.g., using the processor) may actuate a pulse device housed in the payer device 100 to create a repeated pulse vibration of the payer device 100. For example, payer device 100 may actuate the actuator track 112*a* to move the weight physical state change component 112 back and forth relative to the payer device 100 in order to create a repeated pulse vibration, or 'heartbeat', in the payer device 100. While the weight physical state change component 112 and actuator track 112*a* have been described as providing a pulse device, an variety of other pulse devices known in the art may be employed to provide the 'heartbeat' by vibration in the payee device 100.

As the status of the payment changes and is received by the payer device 100, the frequency of the repeated pulse vibration of the payer device 100 may be changed according to the physical state change instructions. Thus, a payer may be provided payer information (e.g., a status of a payment made using the payer account) by changing a repeated pulse vibration induced in the payer device 100 (i.e., a relatively slow repeated pulse vibration in the payer device 100 may indicate that a status of a payment is beginning, while a relatively fast repeated pulse vibration in the payer device 100 may indicate that a status of a payment is nearing completion.) Furthermore, the physical state change instructions may include instructions to proportionally change the frequency of the repeated pulse vibration of the payer device 100 with respect the current status of the payment.

Thus, a variety of physical state changes of a payer device may be performed to provide payer information to a payer. Those physical state changes free the payer from having to manipulate or even look at the payer device to receive the payer information. Although specific examples of payer information have been provided herein, it is contemplated that payer information triggering a physical change in a user or payer device may include any suitable information, including non-financial or payment related information. Examples include, but are not limited to, an approved transaction or payment, a denied transaction or payment, a notification or message sent to the user, where the physical change may vary depending on the content or sender of the message, an unauthorized use of the payer's account, any change in status or information of the payer's account, when a new app is added, when an app has an update, notification of events, such as from the user's calendar, and changes to the device location.

Figure 2J:
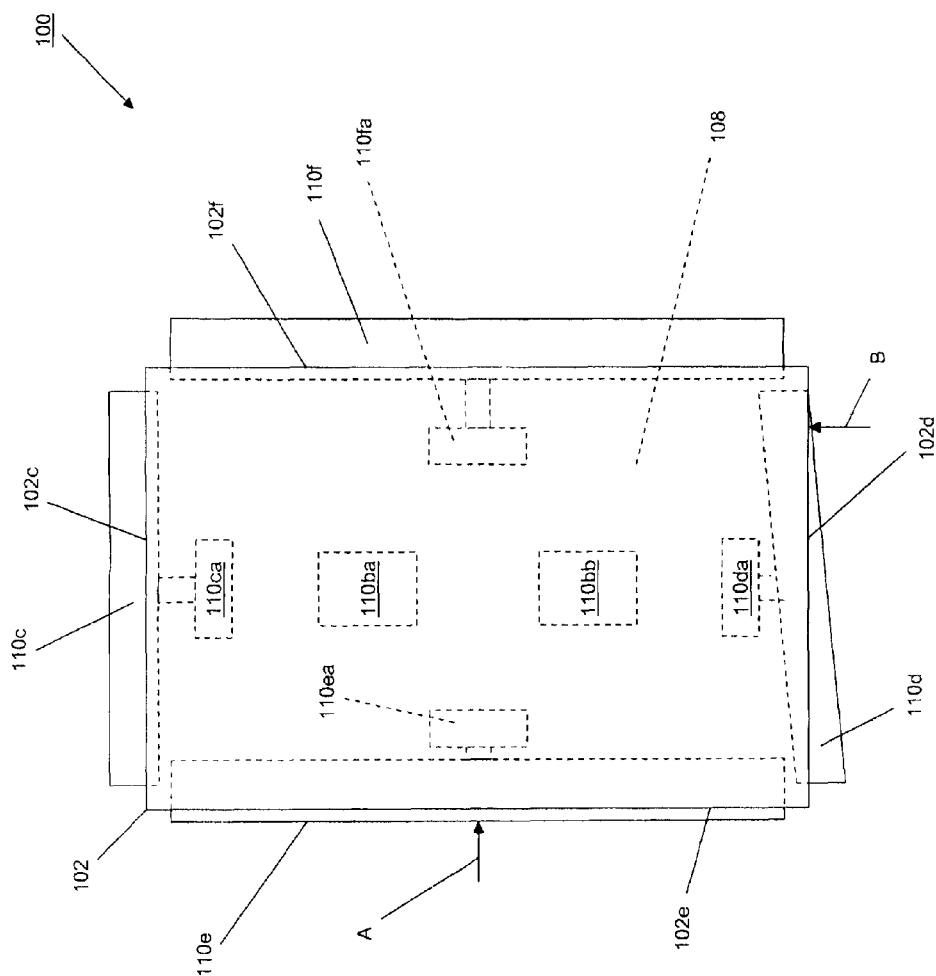
FIG. 2j is a schematic front view illustrating an embodiment of the payer device of FIGS. 1a, 1b, and 1c receiving signals due to a physical state change.

Referring now to FIGS. 2b, 2c, and 2j, the physical state change components on the payer device 100 may also be used to provide information to the payer device 100. For example, the physical state change components of the payee device 100 may be actuated as illustrated in FIGS. 2b and 2c. A payer may then provide a force A on the first side physical state change component 110e to move the first side physical state change component 110e relative to the payer device chassis 102 and partially into the payer device housing 108, and a force B on the bottom physical state change component 110e to move the portion of the bottom physical state change component 110e adjacent the side surface 102f of the payer device 100 relative to the payer device 100 and partially into the payer device housing 108, as illustrated in FIG. 2j. The payer device 100 (e.g., using the processor) may detect the movement of the first side physical state change component 110e and bottom physical state change component 110e relative to the payer device chassis 100 and, in response, determine that the detected movements correspond to a pre-defined movement or sequence of movements of the physical state change components that is stored in the machine-readable medium. In an embodiment, determination that a predefined movement of sequence of movements has occurred may provide credentials for the accessing of the payer account over the network by the payer device 100, accessing the payer device 100 itself, or providing a variety of other instructions know in the art.

Thus, the payer device 100 may allow the payer to provide instructions, commands, and/or other signals to the payer device 100 by changing the physical state of the payer device 100 according to pre-defined movements or sequences of movements of the physical state change components. In an embodiment, the predefined movement or sequence of movements may result in a specific shape of the payer device 100 that the payer device 100 recognizes as providing a pre-defined instruction. Furthermore, the physical state change components may be operable to be manipulated differently than illustrated and described above. For example, the physical state change components may be operable to be removed from the payer device 100, rotated, pivoted, and/or move in a variety of other manners known in the art.

Figure 3:
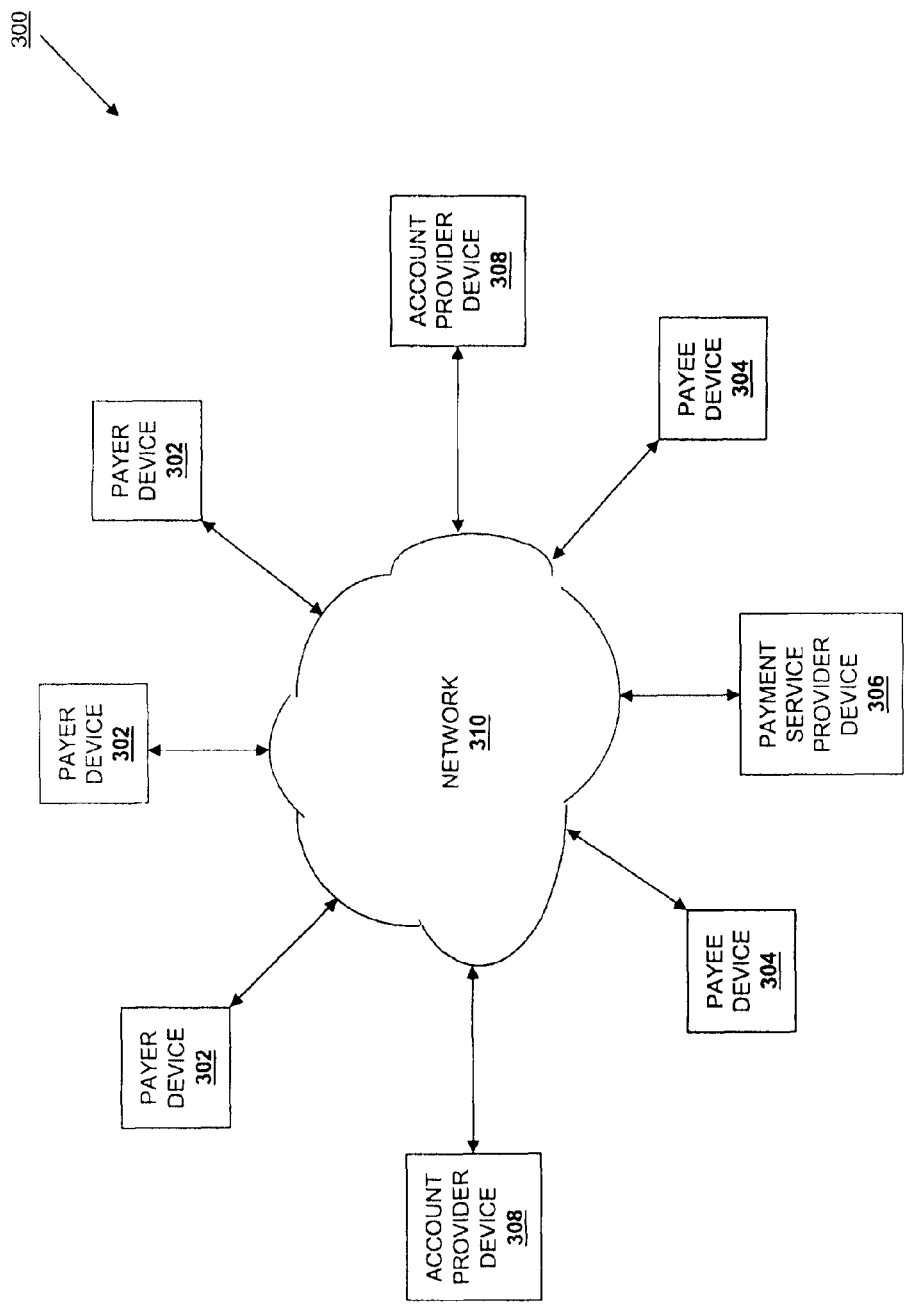
FIG. 3 is a schematic view illustrating an embodiment of a networked system.

Referring now to FIG. 3, an embodiment of a networked system 300 used in the system described above is illustrated. The networked system 300 includes a plurality of payer devices 302, a plurality of payee devices 304, a payment service provider device 306, and a plurality of account provider devices 308 in communication over a network 310. Any of the payer devices 302 may be the payer device 100, discussed above. The payee devices 304 may be the payee devices discussed above and may be operated by the payees discussed above. The payment service provider device 306 may be the payment service provider devices discussed above and may be operated by a payment service provider such as, for example, PayPal Inc. of San Jose, Calif. The account provider devices 308 may be the account provider devices discussed above and may be operated by the account providers discussed above such as, for example, credit card account providers, bank account providers, savings account providers, and a variety of other account providers known in the art.

The payer devices 302, payee devices 304, payment service provider device 306, and account provider devices 308 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 300, and/or accessible over the network 310.

The network 310 may be implemented as a single network or a combination of multiple networks. For example, in various embodiments, the network 310 may include the Internet and/or one or more intranets, landline networks, wireless networks, and/or other appropriate types of networks.

The payer device 302 may be implemented using any appropriate combination of hardware and/or software configured for wired and/or wireless communication over network 310. For example, in one embodiment, the payer device 302 may be implemented as a personal computer of a user in communication with the Internet. In other embodiments, the payer device 302 may be a smart phone, personal digital assistant (PDA), laptop computer, and/or other types of computing devices.

The payer device 302 may include one or more browser applications which may be used, for example, to provide a convenient interface to permit the payer to browse information available over the network 310. For example, in one embodiment, the browser application may be implemented as a web browser configured to view information available over the Internet.

The payer device 302 may also include one or more toolbar applications which may be used, for example, to provide user-side processing for performing desired tasks in response to operations selected by the payer. In one embodiment, the toolbar application may display a user interface in connection with the browser application.

The payer device 302 may further include other applications as may be desired in particular embodiments to provide desired features to the payer device 302. In particular, the other applications may include a payment application for payments assisted by a payment service provider through the payment service provider device 306. The other applications may also include security applications for implementing user-side security features, programmatic user applications for interfacing with appropriate application programming interfaces (APIs) over the network 310, or other types of applications. Email and/or text applications may also be included, which allow the payer to send and receive emails and/or text messages through the network 310. The payer device 302 includes one or more user and/or device identifiers which may be implemented, for example, as operating system registry entries, cookies associated with the browser application, identifiers associated with hardware of the payer device 302, or other appropriate identifiers, such as a phone number. In one embodiment, the user identifier may be used by the payment service provider device 306 and/or account provider device 308 to associate the user with a particular account as further described herein.

The payee device 304 may be maintained, for example, by a conventional or on-line merchant, conventional or digital goods seller, individual seller, and/or application developer offering various products and/or services in exchange for payment to be received conventionally or over the network 310. In this regard, the payee device 304 may include a database identifying available products and/or services (e.g., collectively referred to as items) which may be made available for viewing and purchase by the payer.

The payee device 304 also includes a checkout application which may be configured to facilitate the purchase by the payer of items. The checkout application may be configured to accept payment information from the payer through the payer device 302, the account provider through the account provider device 308, and/or from the payment service provider through the payment service provider device 306 over the network 310.

Figure 4:
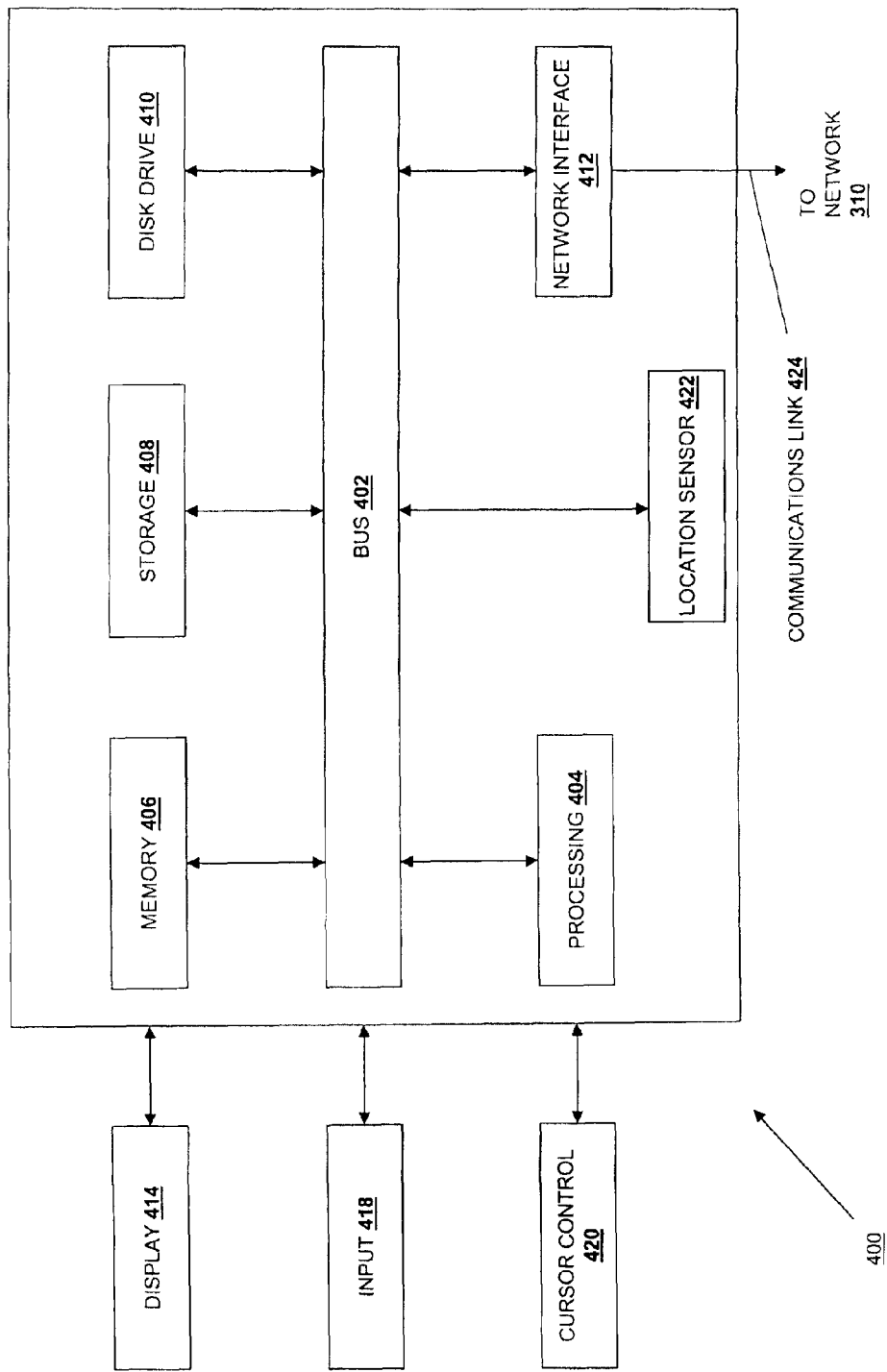
FIG. 4 is a schematic view illustrating an embodiment of a computer system.

Referring now to FIG. 4, an embodiment of a computer system 400 suitable for implementing, for example, the payer device 100, the payer device 302, the payees device 304, the payment service provider device 306, and/or the account provider device 308, is illustrated. It should be appreciated that other devices utilized by payer, payees, payment service providers, and account providers in the payment system discussed above may be implemented as the computer system 400 in a manner as follows:

In accordance with various embodiments of the present disclosure, computer system 400, such as a computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), and/or a location sensor 422 (e.g., a Global Positioning System (GPS) device, a cell tower triangulation device, and/or a variety of other location determination devices known in the art.) In one implementation, the disk drive component 410 may comprise a database having one or more disk drive components.

In accordance with embodiments of the present disclosure, the computer system 400 performs specific operations by the processor 404 executing one or more sequences of instructions contained in the memory component 406, such as described herein with respect to the payer device 100 and 302, the payee device(s) 304, the payment service provider device 306, and/or the account provider device(s) 308. Such instructions may be read into the system memory component 406 from another computer readable medium, such as the static storage component 408 or the disk drive component 410. In other embodiments, hard-wired circuitry may be used in place of or in combination with software instructions to implement the present disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 400. In various other embodiments of the present disclosure, a plurality of the computer systems 400 coupled by a communication link 424 to the network 310 (e.g., such as a LAN, WLAN, PTSN, and/or various other wired or wireless networks, including telecommunications, mobile, and cellular phone networks) may perform instruction sequences to practice the present disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Figure 5:
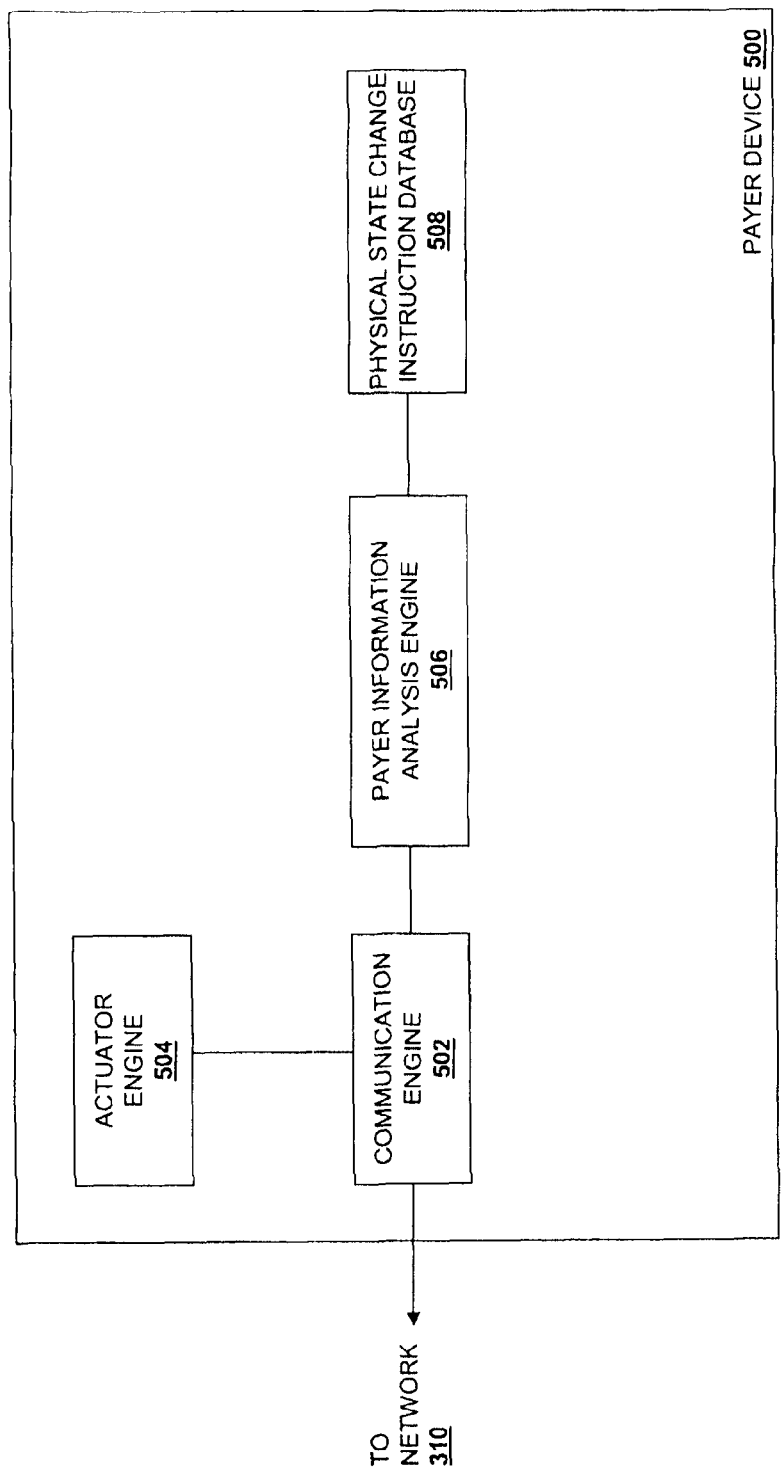
FIG. 5 is a schematic view illustrating an embodiment of a payer device.

Referring now to FIG. 5, an embodiment of a payer device 500 is illustrated. In an embodiment, the device 500 may be the payer device 100 and 302. The payer device 500 includes a communication engine 502 that is coupled to the network 310, an actuator engine 504, and to payer information analysis engine 506 that is coupled to a physical state change instruction database 508. The communication engine 502 may be software or instructions stored on a computer-readable medium that, when executed by a processor, allows the payer device 500 to send and receive information over the network 310, and to send and receive signals (e.g., instructions) to and from the actuators. The payer information analysis engine 506 may be software or instructions stored on a computer-readable medium that, when executed by a processor, allows the payer device 500 to receive payer information from the communication engine 502 and determine if that payer information is associated with physical state change instructions stored in the physical state change instruction database 508. While the physical state change instruction database 508 has been illustrated as located in the payer device 500, one of skill in the art will recognize that it may be connected to the payer information analysis engine 506 through the network 310 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payers and payer accounts; however, a payer, consumer, or user of a device may receive information from a variety of sources. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for providing payer information on a payer device, comprising:
   providing a payer device that includes at least one physical state change component that is moveably coupled to the payer device, coupled to a first surface on the payer device that faces a first direction, and coupled to a second surface on the payer device that faces a second direction that is opposite the first direction;
   receiving payer information over a network;
   determining that the payer information is associated with a first physical state change instruction in a non-transitory, machine-readable medium of the payer device; and
   actuating the at least one physical state change component according to the first physical state change instruction to change a thickness of the payer device by moving the first surface relative to the second surface such that a distance between the first surface and the second surface is adjusted while the first surface continues to face the first direction and the second surface continues to face the second direction.

2. The method of claim 1, wherein the at least one physical state change component is also coupled to a third surface on the payer device that faces a third direction that is perpendicular to both the first direction and the second direction, and coupled to a fourth surface on the payer device that faces a fourth direction that is opposite the third direction, and wherein the actuating comprises:
   moving the third surface relative to the fourth surface such that a distance between the third surface and the fourth surface is adjusted while the third surface continues to face the third direction and the fourth surface continues to face the fourth direction.

3. The method of claim 1, wherein the payer information that is associated with the first physical state change instruction includes a change in a funding amount associated with a payer account.

4. The method of claim 1, wherein the at least one physical state change component includes a weight housed within the payer device, and the method further comprises:
   determining that the payer information is associated with a second physical state change instruction in a non-transitory, machine-readable medium of the payer device; and
   actuating the at least one physical state change component according to the second physical state change instruction to change a center of gravity of the payer device by moving the weight from a first position adjacent a first end of the payer device to a second position adjacent a second end of the payer device.

5. The method of claim 4, wherein the payer information that is associated with the second state change instruction includes a change in a funding amount associated with a payer account.

6. The method of claim 1, wherein the at least one physical state change component includes a pulse device housed within the payer device, and wherein the method further comprises:
   determining that the payer information is associated with a third physical state change instruction in a non-transitory, machine-readable medium of the payer device; and
   actuating the at least one physical state change component according to the third physical state change instruction to provide a repeating pulse vibration in the payer device using the pulse device; and
   change the frequency of the repeating pulse vibration.

7. The method of claim 6, wherein the payer information that is associated with the third physical state change instruction includes a change in a status of a payment being made from a payer account.

8. The method of claim 1, further comprising:
   accessing a payer account over the network in response to detecting a pre-defined movement of the at least one physical state change component relative to the payer device.

9. A payer device, comprising:
   a payer device chassis defining a payer device housing and including a first surface that faces a first direction and a second surface that faces a second direction that is opposite the first direction;
   a processor located in the payer device housing;
   a network interface located in the payer device housing and coupled to the processor;

at least one physical state change component coupled to the first surface and the second surface on the payer device chassis; and at least one non-transitory, machine-readable medium located in the payer device housing and coupled to the processor, the at least one machine readable medium including instructions that, when executed by the processor, cause the processor to:

receive payer information over a network using the network interface;

determine that the payer information is associated with a first physical state change instruction included on the at least one non-transitory, machine-readable medium; and actuate the at least one physical state change component according to the first physical state change instruction to change a thickness of the payer device chassis by moving the first surface relative to the second surface such that a distance between the first surface and the second surface is adjusted while the first surface continues to face the first direction and the second surface continues to face the second direction.

10. The payer device of claim 9, wherein the at least one physical state change component is also coupled to a third surface on the payer device that faces a third direction that is perpendicular to both the first direction and the second direction, and coupled to a fourth surface on the payer device that faces a fourth direction that is opposite the third direction, and wherein the actuating comprises:

moving the third surface relative to the fourth surface such that a distance between the third surface and the fourth surface is adjusted while the third surface continues to face the third direction and the fourth surface continues to face the fourth direction.

11. The payer device of claim 9, wherein the payer information that is associated with the first physical state change instruction includes a change in a funding amount associated with a payer account.

12. The payer device of claim 9, wherein the at least one physical state change component includes a weight housed in the payer device housing, and wherein the at least one physical state change component is configured, when actuated according to a second physical state change instruction, to change a center of gravity of the payer device chassis by moving the weight from a first position adjacent a first end of the payer device chassis to a second position adjacent a second end of the payer device chassis.

13. The payer device of claim 12, wherein the payer information that is associated with the second physical state change instruction that is configured to cause the weight to move from a first position adjacent a first end of the payer device chassis to a second position adjacent a second end of the payer device chassis includes a change in a funding amount associated with a payer account.

14. The payer device of claim 9, wherein the at least one physical state change component includes a pulse device housed in the payer device housing, and wherein the at least one physical state change component is configured, when actuated according to a third physical state change instruction, to provide a repeating pulse vibration in the payer device chassis and change the frequency of the repeating pulse vibration.

15. The payer device of claim 14, wherein the payer information that is associated with the third physical state change instruction that is configured to cause the provision of the repeating pulse vibration in the payer device chassis and the changing frequency of the repeating pulse vibration includes a change in a status of a payment being made from a payer account.

16. The payer device of claim 9, wherein the at least one machine-readable medium includes instructions that, when executed by the processor, cause the processor to:

access a payer account over the network using the network interface in response to detecting a pre-defined movement of the at least one physical state change component relative to the payer device chassis.

17. A payer information provision system, comprising:

means for changing the physical state of a payer device that includes first surface on the payer device that faces a first direction, and coupled to a second surface on the payer device that faces a second direction that is opposite the first direction;

means for receiving payer information;

means for determining that the payer information is associated with a first physical state change instruction; and means for actuating the means for changing the physical state of the payer device according to the first physical state change instruction to change a thickness of the payer device by moving the first surface relative to the second surface such that a distance between the first surface and the second surface is adjusted while the first surface continues to face the first direction and the second surface continues to face the second direction.

18. The system of claim 17, wherein the payer device also includes a third surface that faces a third direction that is perpendicular to both the first direction and the second direction, and a fourth surface that faces a fourth direction that is opposite the third direction, and wherein the system further includes:

means for actuating the means for changing the physical state of the payer device according to the physical state change instruction to change the thickness of the payer device by moving the third surface relative to the fourth surface such that a distance between the third surface and the fourth surface is adjusted while the third surface continues to face the third direction and the fourth surface continues to face the fourth direction.

19. The system of claim 17, wherein the means for changing the physical state of the payer device include means for providing a repeating pulse vibration in the payer device and means for changing the frequency of the repeating pulse vibration in response to detecting a change in a status of a payment being made from a payer account.

20. The system of claim 17, further comprising:

means for accessing a payer account over the network in response to detecting a pre-defined movement of the means for changing the physical state of the payer device.

* * * * *